US012236895B2

(12) United States Patent
Zeng et al.

(10) Patent No.: US 12,236,895 B2
(45) Date of Patent: Feb. 25, 2025

(54) DISPLAY PANEL AND DISPLAY DEVICE

(71) Applicant: Shenzhen China Star Optoelectronics Semiconductor Display Technology Co., Ltd., Guangdong (CN)

(72) Inventors: Yuchao Zeng, Guangdong (CN); Pengfei Liang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/511,783

(22) Filed: Nov. 16, 2023

(65) Prior Publication Data

US 2024/0257767 A1 Aug. 1, 2024

(30) Foreign Application Priority Data

Jan. 31, 2023 (CN) ........................ 202310118612.X

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0852* (2013.01); *G09G 2310/0251* (2013.01); *G09G 2310/0262* (2013.01); *G09G 2310/0286* (2013.01); *G09G 2310/08* (2013.01)

(58) Field of Classification Search
CPC ............... G09G 3/3266; G09G 3/3233; G09G 2300/0852; G09G 2310/0251; G09G 2310/0262; G09G 2310/0286; G09G 2310/08
See application file for complete search history.

(56) References Cited

U.S. PATENT DOCUMENTS

2014/0225817 A1* 8/2014 Huang ................. G09G 3/3677 345/87
2020/0202777 A1* 6/2020 Lee .......................... G09G 3/20
2021/0335199 A1* 10/2021 Yuan .................... G09G 3/2092
2023/0215335 A1* 7/2023 Park ..................... G09G 3/2096 345/214

* cited by examiner

*Primary Examiner* — Lixi C Simpson
(74) *Attorney, Agent, or Firm* — PV IP PC; Wei Te Chung

(57) ABSTRACT

A display panel and a display device are provided. The display panel includes pixel circuits arranged in an array and scan lines. Each pixel circuit in a N-th row of pixel circuits includes a driving transistor, a writing transistor, and a sensing transistor. A N-th scan line is configured to control charging of the N-th row of pixel circuits, a (N+1)-th scan line is configured to control the charging of a (N+1)-th row of pixel circuits, a gate of the writing transistor in each pixel circuit of the N-th row of pixel circuits is electrically connected to the N-th scan line, and a gate of the sensing transistor in each pixel circuit of the N-th row of pixel circuits is electrically connected to the (N+1)-th scan line.

12 Claims, 3 Drawing Sheets

DISPLAY PANEL AND DISPLAY DEVICE

CROSS-REFERENCE TO RELATED APPLICATION

This application claims priority to Chinese Patent Application No. 202310118612.X, filed on Jan. 31, 2023, the disclosure of which is incorporated herein by reference in its entirety.

TECHNICAL FIELD

The present disclosure relates to display technologies, and in particular, to a display panel and a display device.

BACKGROUND

Each externally compensated pixel circuit typically requires two scan lines for data signal writing and potential detection, respectively, which increases a number of scan lines in a display panel.

At the same time, the two scan lines need two different gate driving circuits to provide scan signals with different waveforms, which increases the number of gate driving circuits and occupied space, and is not conducive to realization of narrow borders.

SUMMARY

In a first aspect, the present disclosure provides a display panel, and the display panel includes a plurality of pixel circuits arranged in an array and a plurality of scan lines. Each of the plurality of scan lines is configured to control charging of a corresponding row of pixel circuits in the array, an N-th scan line of the plurality of scan lines is configured to control charging of a N-th row of pixel circuits in the array, a (N+1)-th scan line is configured to control charging of a (N+1)-th row of pixel circuits of the plurality of scan lines, N being a positive integer. Furthermore, each pixel circuit in the N-th row of pixel circuits includes a driving transistor, a writing transistor, and a sensing transistor. A first electrode of the driving transistor is electrically connected to a first power line, and a second electrode of the driving transistor is electrically connected to a second power line. A first electrode of the writing transistor is electrically connected to a data line, a second electrode of the writing transistor is electrically connected to a gate of the driving transistor, and a gate of the writing transistor is electrically connected to the N-th scan line. A first electrode of the sensing transistor is electrically connected to a sensing line, a second electrode of the sensing transistor is electrically connected to the second electrode of the driving transistor, and a gate of the sensing transistor is electrically connected to the (N+1)-th scan line.

In a second aspect, the present disclosure provides a display device. The display device includes a display panel. The display panel includes a plurality of pixel circuits arranged in an array and a plurality of scan lines. Each of the plurality of scan lines is configured to control charging of a corresponding row of pixel circuits in the array, an N-th scan line of the plurality of scan lines is configured to control charging of a N-th row of pixel circuits in the array, a (N+1)-th scan line is configured to control charging of a (N+1)-th row of pixel circuits of the plurality of scan lines, N being a positive integer. Furthermore, each pixel circuit in the N-th row of pixel circuits includes a driving transistor, a writing transistor, and a sensing transistor. A first electrode of the driving transistor is electrically connected to a first power line, and a second electrode of the driving transistor is electrically connected to a second power line. A first electrode of the writing transistor is electrically connected to a data line, a second electrode of the writing transistor is electrically connected to a gate of the driving transistor, and a gate of the writing transistor is electrically connected to the N-th scan line. A first electrode of the sensing transistor is electrically connected to a sensing line, a second electrode of the sensing transistor is electrically connected to the second electrode of the driving transistor, and a gate of the sensing transistor is electrically connected to the (N+1)-th scan line.

BRIEF DESCRIPTION OF THE DRAWINGS

The following is a detailed description of specific implementation methods of the present disclosure in conjunction with the drawings, which will make technical solutions and other beneficial effects of the present disclosure apparent.

DETAILED DESCRIPTION

The following will provide a clear and complete description of the technical solutions in embodiments of the present disclosure in conjunction with drawings in the embodiments. Apparently, the described embodiments are only a part of the embodiments of the present disclosure, not all of them. Based on the embodiments in the present disclosure, all other embodiments obtained by those skilled in the art without creative work should fall within the scope of protection of the present disclosure.

In addition, terms "first" and "second" are used for descriptive purposes only and cannot be understood as indicating or implying relative importance or implying the number of indicated technical features. Thus, the features defined with "first" or "second" may be explicitly or implicitly defined to include one or more of the described features. In the description of the present disclosure, "a plurality of" means two or more unless specifically defined otherwise.

Figure 1:
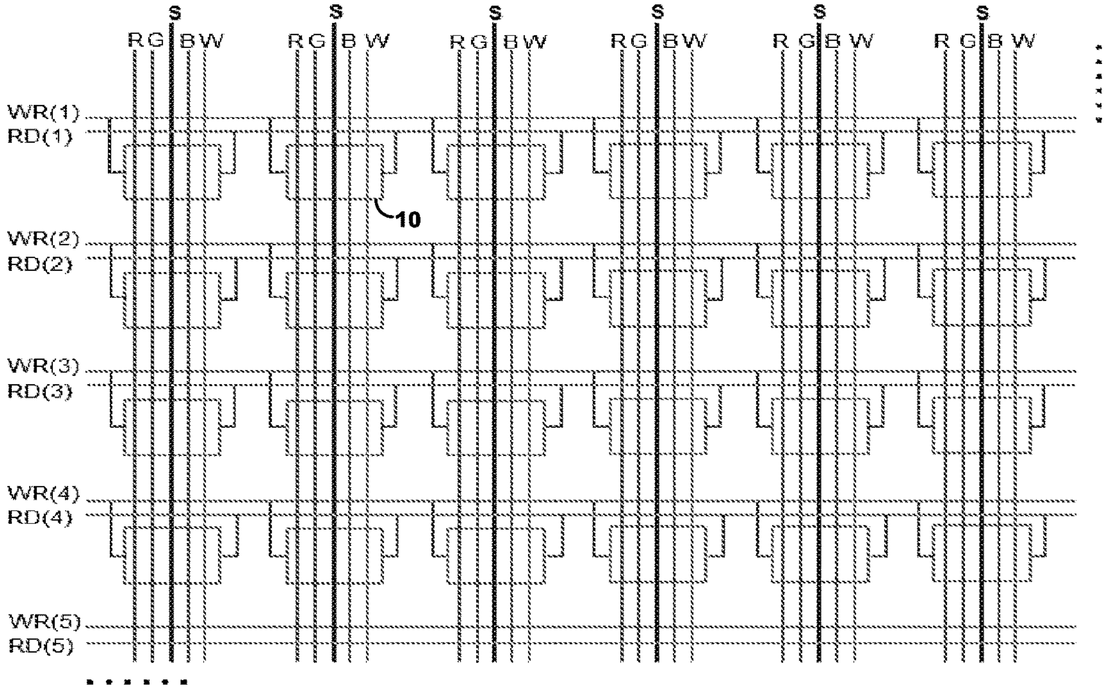
FIG. 1 (Related art)
FIG. 1 illustrates a schematic structural diagram of a display panel in the related art.

FIG. 1 illustrates a schematic structural diagram of a display panel in the related art. The display panel includes a plurality of pixel circuits 10 arranged in an array, some vertical lines, and some horizontal lines. For example, the vertical lines can be lines corresponding to R, G, B, W, and S. Specifically, the lines corresponding to S can be sensing lines. The lines corresponding to R, G, B, and W can be corresponding data lines configured to provide corresponding data signals for red sub-pixels, green sub-pixels, blue sub-pixels, and white sub-pixels, respectively. For example, the horizontal lines can be scan lines corresponding to WR(1), RD(1), WR(2), RD(2), WR(3), RD(3), WR(4), RD(4), WR(5), and RD(5). Specifically, the scan lines corresponding to WR(1), WR(2), WR(3), WR(4), and WR(5) can be provided with corresponding scanning signals by a plurality of gate driving units in a gate driving circuit. The scan lines corresponding to RD(1), RD(2), RD(3), RD(4), and RD(5) can be provided with corresponding scanning signals by a plurality of gate driving units in another gate driving circuit.

Furthermore, WR(1) and RD(1) provide corresponding scanning signals for each pixel circuit 10 in a first row of pixel circuits 10 to achieve data signal writing and potential detection for the each pixel circuit 10 in the first row of pixel circuits. WR(2) and RD(2) provide corresponding scanning signals for each pixel circuit 10 in the second row of pixel circuits 10 to achieve data signal writing and potential detection for the each pixel circuit 10 in the second row of pixel circuits. WR(3) and RD(3) provide corresponding scanning signals for each pixel circuit 10 in the third row of pixel circuits 10 to achieve data signal writing and potential detection for the each pixel circuit 10 in the third row of pixel circuits 10. WR(4) and RD(4) provide corresponding scanning signals for each pixel circuit 10 in the fourth row of pixel circuits 10 to achieve data signal writing and potential detection for the each pixel circuit 10 in the fourth row of pixel circuits 10. WR(5) and RD(5) provide corresponding scanning signals for each pixel circuit 10 in the fifth row of pixel circuits 10 to achieve data signal writing and potential detection for the each pixel circuit 10 in the fifth row of pixel circuits 10.

However, the above driving method requires each row of pixel circuits in the display panel to be equipped with two corresponding scan lines, which increases the number of scan lines used in the display panel. At the same time, the above driving method also requires more gate driving circuits or gate driving chips, which not only increases costs but also occupies more space, making it difficult to achieve narrow borders.

Figure 2:
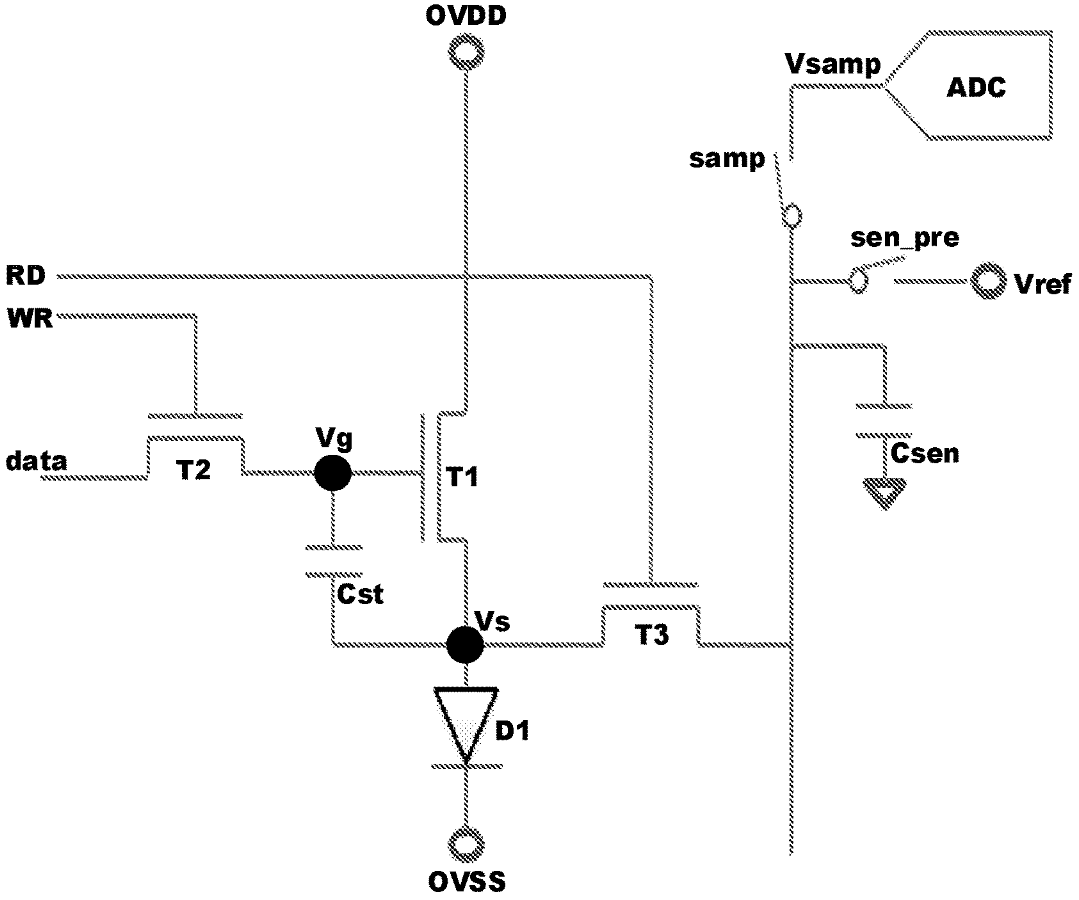
FIG. 2 (Related art)
FIG. 2 illustrates a schematic structural diagram of a pixel circuit in FIG. 1.

Specifically, FIG. 2 illustrates a schematic structural diagram of the pixel circuit 10 in FIG. 1. In the pixel circuit 10, a first electrode of a writing transistor T2 is connected to a data line. A second electrode of the writing transistor T2 is electrically connected to a terminal of a storage capacitor Cst and a gate of a driving transistor T1. A gate of the writing transistor T2 is electrically connected to a scan line WR. For example, the scan line WR can be the scan line WR(1), the scan line WR(2), the scan line WR(3), the scan line WR(4), or the scan line WR(5) shown in FIG. 1. A first electrode of a sensing transistor T3 is electrically connected to a sensing line, and the sensing line can be a line corresponding to S in FIG. 1. A second electrode of the sensing transistor T3 is electrically connected to a second electrode of the driving transistor T1. A gate of the sensing transistor T3 is electrically connected to a scan line RD. For example, the scan line RD can be the scan line RD(1), the scan line RD(2), the scan line RD(3), the scan line RD(4), or the scan line RD(5) shown in FIG. 1.

Figure 3:
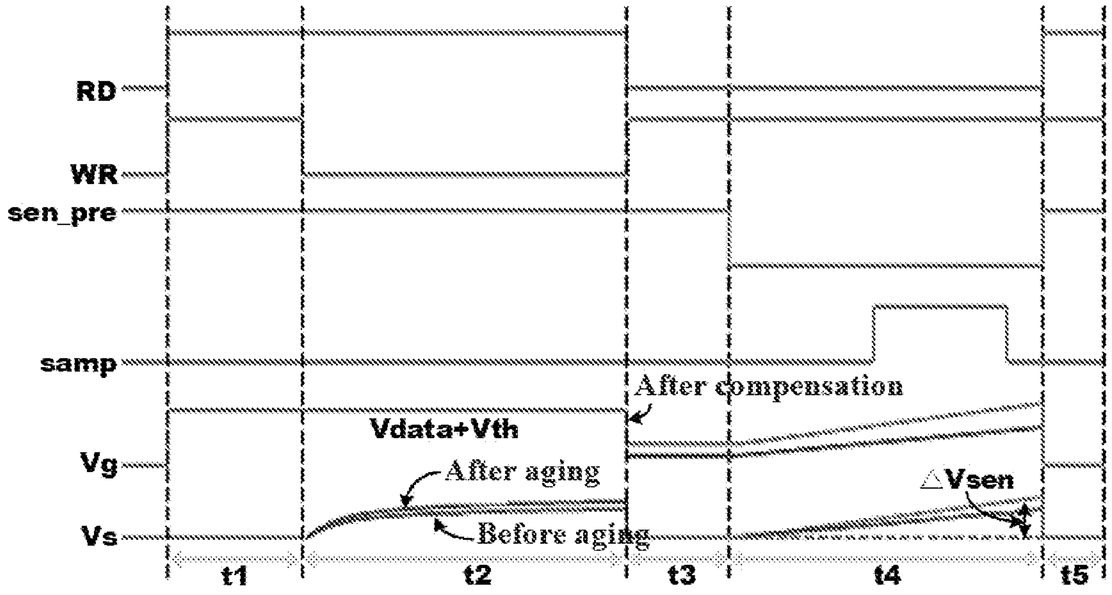
FIG. 3 (Related art)
FIG. 3 illustrates a timing diagram of the pixel circuit in FIG. 2.

FIG. 3 illustrates a timing diagram of the pixel circuit in FIG. 2. In one frame, a working process of the pixel circuit 10 can include the following stages.

In a stage t1: the scan line WR, the scan line RD, and a first control signal sen_pre transmitted in a first control line are all at high potentials; and correspondingly, the writing transistor T2, the sensing transistor T3, and a first switch are all turned on, a gate potential Vg of the driving transistor T1 is raised to Vdata+Vth, and a source potential Vs of the driving transistor T1 is maintained at a pre-charging voltage Vref. Vdata represents a potential of a data signal. Vth represents a threshold voltage of the driving transistor T1.

In a stage t2: the scan line WR is at a low potential, and the scan line RD and the first control signal sen_pre transmitted in the first control line are all at high potentials; and correspondingly, the writing transistor T2 is turned off, the sensing transistor T3 and the first switch are both turned on, and the source potential Vs of the driving transistor T1 begins to rise. The source potential Vs of the driving transistor T1 rises higher as the aging of a light-emitting component D1 is more serious. For example, the source potential Vs of the driving transistor T1 after aging of the light-emitting component D1 is higher than the source potential Vs of the driving transistor T1 before the aging of the light-emitting component D1.

In a stage t3: the scan line WR and the first control signal sen_pre transmitted in the first control line are all at high potentials, and the scan line RD is at a low potential; and correspondingly, both the writing transistor T2 and the first switch are turned on, the sensing transistor T3 is turned off, the gate potential Vg of the driving transistor T1 decreases, and the source potential Vs of driving transistor T1 decreases.

In a stage t4: the scan line WR is at a high potential, and the scan line RD and the first control signal sen_pre transmitted in the first control line are all at low potentials; and correspondingly, the writing transistor T2, the sensing transistor T3 and the first switch are turned off, then a second control signal samp transmitted in the second control line is raised to a high potential. At this time, an analog-to-digital converter ADC collects the source potential Vs of the driving transistor T1, that is, the analog-to-digital converter ADC is configured to acquire a voltage change ΔVsen of the sensing capacitor Csen.

In a stage t5: the scan line WR, the scan line RD, and the first control signal sen_pre transmitted in the first control line are all at high potentials; and correspondingly, the writing transistor T2, the sensing transistor T3, and the first switch are all turned on, and the gate and the source of the driving transistor T1 are reset.

Figure 4:
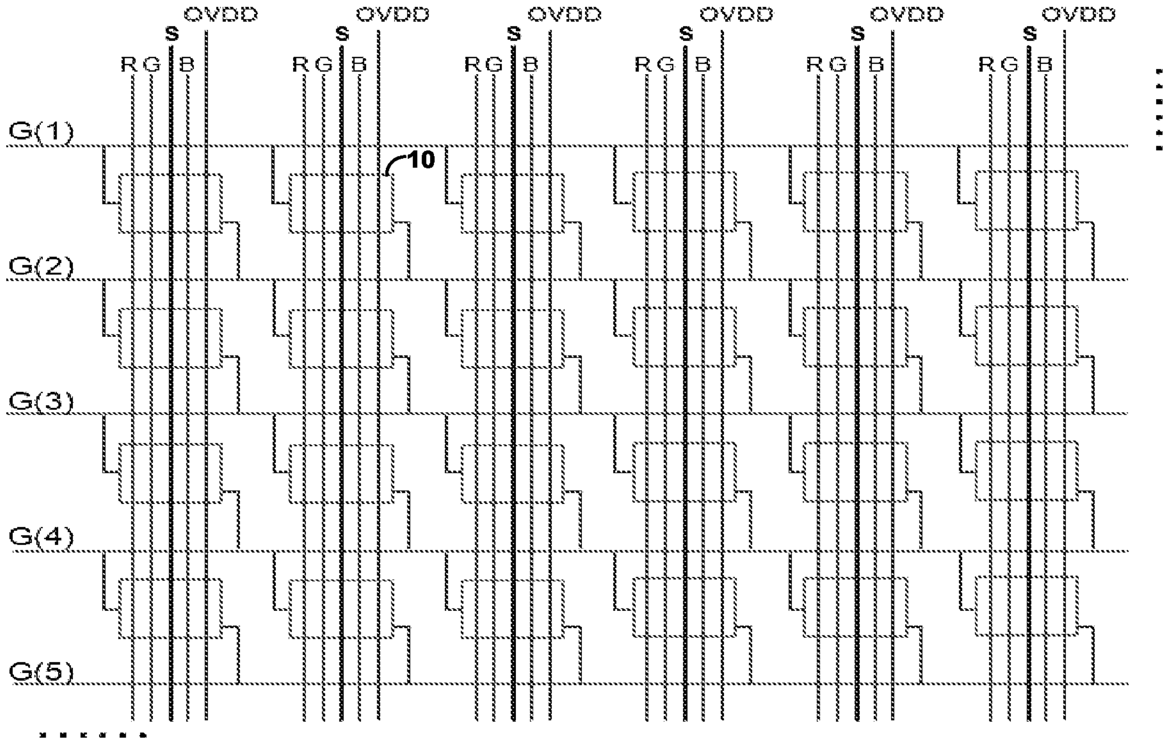
FIG. 4 illustrates a schematic structural diagram of a display panel according to some embodiments of the present disclosure.
Figure 5:
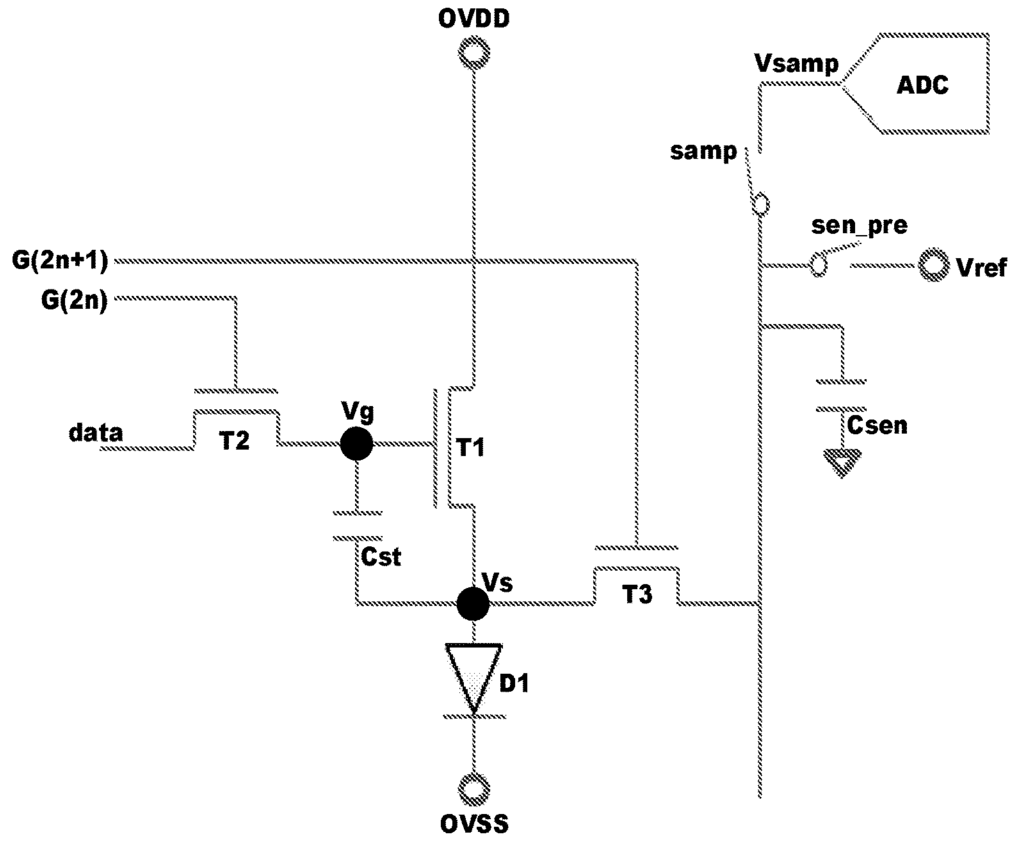
FIG. 5 illustrates a schematic structural diagram of a pixel circuit in FIG. 4.
Figure 6:
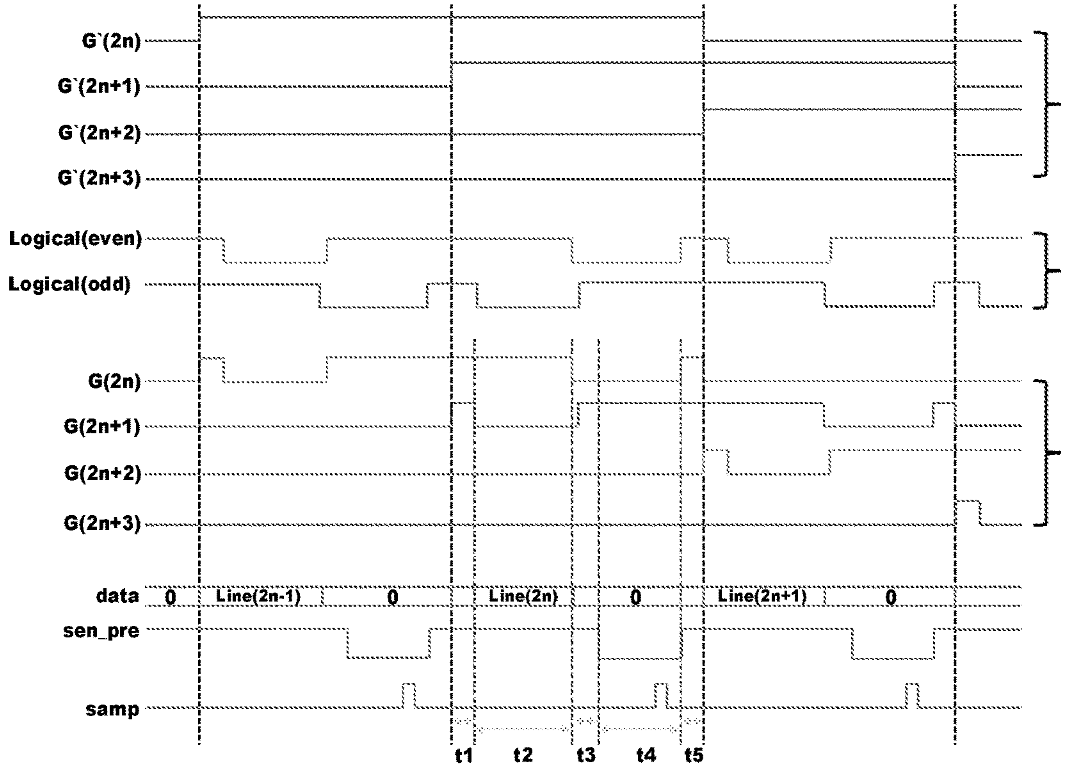
FIG. 6 illustrates a timing diagram of the pixel circuit in FIG. 5.

In order to reduce scan lines required for each externally compensated pixel circuit, in some embodiments, the present disclosure provides a display panel, please refer to FIG. 4 to FIG. 6. As shown in FIG. 4 and FIG. 5, the display panel includes a plurality of pixel circuits 10 arranged in an array and a plurality of scan lines. Each scan line is configured to control charging of a corresponding row of pixel circuits in the array. An N-th scan line of the plurality of scan lines is configured to control charging of an N-th row of pixel circuits in the array, a (N+1)-th scan line of the plurality of scan lines is configured to control charging of a (N+1)-th row of pixel circuits in the array, and N is a positive integer. Furthermore, each pixel circuit 10 in the N-th row of pixel circuits includes a driving transistor T1, a writing transistor T2, and a sensing transistor T3. A first electrode of the driving transistor T1 is electrically connected to a first power line, and a second electrode of the driving transistor T1 is electrically connected to a second power line. A first electrode of the writing transistor T2 is electrically connected to a data line, a second electrode of the writing transistor T2 is electrically connected to a gate of the driving transistor T1, and a gate of the writing transistor T2 is electrically connected to the N-th scan line. A first electrode of the sensing transistor T3 is electrically connected to a sensing line, a second electrode of the sensing transistor T3 is electrically connected to the second electrode of the driving transistor T1, and a gate of the sensing transistor T3 is electrically connected to the (N+1)-th scan line.

It should be understood that, in the display panel provided in the above embodiments, the N-th scan line is configured to control the charging of the N-th row of pixel circuits, and the (N+1)-th scan line is configured to control the charging of the (N+1)-th row of pixel circuits, the gate of the writing transistor T2 in each pixel circuit 10 of the N-th row of pixel circuits is electrically connected to the N-th scan line, the gate of the sensing transistor T3 in each pixel circuit of the N-th row of pixel circuits is electrically connected to the (N+1)-th scan line, and the gate of the sensing transistor T3 can reuse the (N+1)-th scan line, which is configured to control the charging of the (N+1)-th row of pixel circuits, and thus there is no need to configure two different scan lines for each row of externally compensated pixel circuits, reducing the number of scan lines used in the display panel.

In addition, since the N-th scan line is configured to control the charging of the N-th row of pixel circuits and the (N+1)-th scan line is configured to control the charging of the (N+1)-th row of pixel circuits, corresponding scanning signals required in the N-th scan line and the (N+1)-th scan line are the same in waveform but different in phase. Therefore, the corresponding scanning signals can be provided through corresponding gate driving units in a same gate driving circuit, eliminating the need for configuring multiple gate driving circuits, which reduces the number and occupied space of the gate driving circuits, thereby facilitating realization of narrow borders.

It should be noted that the data line is configured to transmit a data signal (data), and can be one of lines corresponding to R, G, and B in FIG. 4. The sensing line can be the line corresponding to S in FIG. 4. The first power line can be the line corresponding to OVDD in FIG. 4.

G(1) can be a first scan line configured to control the charging of the first row of pixel circuits. G(2) can be a second scan line configured to control the charging of the second row of pixel circuits, and further to control the sensing transistor T3 of each pixel circuit 10 in the first row of pixel circuits. G(3) can be a third scan line configured to control the charging of the third row of pixel circuits, and further to control the sensing transistor T3 of each pixel circuit 10 in the second row of pixel circuits. G(4) can be a fourth scan line configured to control the charging of the fourth row of pixel circuits, and further to control the sensing transistor T3 of each pixel circuit 10 in the third row of pixel circuits. G(5) can be a fifth scan line configured to control the charging of the fifth row of pixel circuits, and further to control the sensing transistor T3 of each pixel circuit 10 in the fourth row of pixel circuits.

It should be noted that the first electrode can be one of a drain or a source, and the second electrode can be the other of the drain or the source. For example, when the first electrode is the drain, the second electrode is the source; or when the first electrode is the source, the second electrode is the drain.

In some embodiments, referring to FIG. 5, the pixel circuit 10 further includes a light-emitting component D1, a storage capacitor Cst, a sensing capacitor Csen, a first switch, and a second switch. An anode of the light-emitting component D1 is electrically connected to the second electrode of the driving transistor T1, and a cathode of the light-emitting component D1 is electrically connected to the second power line. A terminal of the storage capacitor Cst is electrically connected to the gate of the driving transistor T1, and another terminal of the storage capacitor Cst is electrically connected to the second electrode of the driving transistor T1. A terminal of the sensing capacitor Csen is electrically connected to the sensing line, and another terminal of the sensing capacitor Csen is grounded. A terminal of the first switch is electrically connected to the sensing line, another terminal of the first switch is electrically connected to a reference voltage line, and a control terminal of the first switch is electrically connected to a first control line. A terminal of the second switch is electrically connected to the sensing line, another terminal of the second switch is electrically connected to an input terminal of an analog-to-digital converter, and a control terminal of the second switch is electrically connected to a second control line. The reference voltage line has a pre-charging voltage Vref.

It should be noted that the first power line is configured to transmit a positive power signal (OVDD), and the second power line is configured to transmit a negative power signal (OVSS). A potential of the positive power signal is higher than a potential of the negative power signal.

Furthermore, the light-emitting component D1 can be one of an organic light-emitting diode, a quantum dot light-emitting diode, a mini light-emitting diode, or a micro light-emitting diode.

FIG. 5 illustrates a timing diagram of the pixel circuit in FIG. 5. In one frame, a working process of the pixel circuit 10 can include the following stages.

In a pre-charging stage t1: a scanning signal G(**2*n*) transmitted in a 2n-th scan line, a scanning signal G(2*n*+1) transmitted in a (2n+1)-th scan line, and a first control signal sen_pre transmitted in a first control line are all at high potentials; and correspondingly, a writing transistor T2, a sensing transistor T3, and a first switch are all turned on, a detection voltage is written into a gate of a driving transistor T1, and a pre-charging voltage Vref is written into a second electrode of the driving transistor T1**.

In a lifting stage t2: the scanning signal G(**2*n*) transmitted in the 2n-th scan line and the first control signal sen_pre transmitted in the first control line are all at high potentials, and the scanning signal G(2*n*+1) transmitted in the (2n+1)-th scan line is at a low potential; and correspondingly, the writing transistor T2 and the first switch are turned on, the sensing transistor T3 is turned off, and a potential of the second electrode of the driving transistor T1** is lifted by a storage capacitor Cst.

In a pre-detection stage t3: the scanning signal G(**2*n*) transmitted in the 2n-th scan line is at a low potential, the first control signal sen_pre transmitted in the first control line and the scanning signal G(2*n*+1) transmitted in the (2n+1)-th scan line are at high potentials; and correspondingly, the writing transistor T2 is turned off, the sensing transistor T3 and the first switch are turned on, and the pre-charging voltage Vref is written into the second electrode of the driving transistor T1**.

The pre-charging voltage Vref is written into the source of the driving transistor T1 through the sensing transistor T3. Since the writing transistor T2 is turned off and the source potential Vs of the driving transistor T1 changes, a voltage difference between the gate potential Vg of the driving transistor T1 and the source potential Vs of the driving transistor T1 is the same as a voltage difference between the gate potential Vg of the driving transistor T1 and the source potential Vs of the driving transistor T1 at the last moment of the lifting stage t2 under the effect of capacitive coupling of the gate potential Vg of the driving transistor T1. In other words, a current flowing through the driving transistor T1 is the same as a current at the last moment of the lifting stage t2.

In a detection stage t4: the scanning signal G(**2*n***) transmitted in the 2n-th scan line and the first control signal sen_pre transmitted in the first control line are at low potentials, and the scanning signal G(2n+1) transmitted in the (2n+1)-th scan line and a second control signal samp transmitted in a second control line are at high potentials; and correspondingly, the writing transistor T2 and the first switch are turned off, the sensing transistor T3 is turned on and the second switch is turned on after a period of time after the sensing transistor T3 is turned on. The sensing transistor T3 is turned on to charge the sensing capacitor Csen during a preset time interval. The second switch is turned on to obtain the potential of the second electrode of the driving transistor T1 through an analog-to-digital converter ADC.

Furthermore, since the writing transistor T2 is turned off, the Vgs of the driving transistor T1 is maintained constant, and a constant current (the same as the current at the last moment of the lifting stage t2) charges the sensing capacitor Csen. After the sensing capacitor Csen is charged for a period of time, the source potential Vs of the driving transistor T1 is sampled by the analog-to-digital converter ADC.

In a reset stage t5: the scanning signal G(2n) transmitted in the 2n-th scan line, the scanning signal G(2n+1) transmitted in the (2n+1)-th scan line, and the first control signal sen_pre transmitted in the first control line are at high potentials, the second control signal samp transmitted in the second control line is at a low potential, the writing transistor T2, the sensing transistor T3, and the first switch are turned on, the second switch is turned off, a black frame insertion voltage is written into the gate of the driving transistor T1, and the pre-charge voltage Vref is written into the second electrode of the driving transistor T1, thereby ensuring that detection stages performed by other rows of pixel circuits in the array are not affected.

It should be noted that the above embodiments are described based on a condition that transistors and switches are turned on at high potentials and turned off at low potentials. The present disclosure is not limited to this condition. In some embodiments, the transistors and switches can be turned off at high potentials, and the transistors and switches can be turned on at low potentials.

In some embodiments, the display panel further includes a gate driving circuit. The gate driving circuit includes a plurality of cascaded gate driving units and a plurality of logic AND gate units. A first input terminal of each of the multiple logic AND gate units is electrically connected to an output terminal of a corresponding one of the plurality of gate driving units, a second input terminal of each logic AND gate unit is electrically connected to a first logic control line or a second logic control line, and an output terminal of each logic AND gate unit is electrically connected to a corresponding scan line.

In this way, required scanning signals may be obtained by adding a corresponding logic AND gate unit to each output terminal of an original gate driving circuit, without redesigning a structure of the gate driving circuit, which simplifies the design and production process.

The signal transmitted in the first logical control line can be as shown in Logical (even) in FIG. 6. The signal transmitted in the second logic control line can be as shown in Logical (odd) in FIG. 6.

In some embodiments, when the output terminal of the logic AND gate unit is electrically connected to the gate of the writing transistor T2 in an even row of pixel circuits 10, the second input terminal of the logic AND gate unit is electrically connected to the first logic control line. When the output terminal of the logic AND gate unit is electrically connected to the gate of the writing transistor T2 in an odd row of pixel circuits 10, the second input terminal of the logic AND gate unit is electrically connected to the second logic control line.

It should be noted that in FIG. 6, G'(2n), G'(2n+1), G'(2n+2), and G'(2n+3) are all scanning signals output by the original gate driving circuit. G(2n), G(2n+1), G(2n+2), and G(2n+3) are all scanning signals obtained after G'(2n), G'(2n+1), G'(2n+2), and G'(2n+3) pass through the logic AND gate units.

AND logical operations may be performed on the scanning signals of even rows of pixel circuits (e.g., G'(2n) and G'(2n+2)) and the signal Logical (even) to obtain the corresponding scanning signals G(2n) and G(2n+2). AND logical operations may be performed on the scanning signals of odd rows of pixel circuits (e.g., G'(2n+1) and G'(2n+3)) and the signal Logical (odd) to obtain the corresponding scanning signals G(2n+1) and G(2n+3).

It should be noted that the timing shown in FIG. 6 can detect the electrical properties of the light-emitting component D1 in a voltage manner, which is lower in cost compared to detecting the electrical properties of the light-emitting component D1 in a current manner, and there is no detection error caused by the integrator.

In some embodiments, the embodiment provides a display device. The display device includes the display panel in at least one of the above embodiments.

It can be understood that since the display device provided in the embodiment includes the display panel in at least one of the above embodiments, the N-th scan line is configured to control the charging of the N-th row of pixel circuits, and the (N+1)-th scan line is configured to control the charging of the (N+1)-th row of pixel circuits. The gate of the writing transistor T2 in each pixel circuit 10 of the N-th row of pixel circuits is electrically connected to the N-th scan line, the gate of the sensing transistor in each pixel circuit of the N-th row of pixel circuits is electrically connected to the (N+1)-th scan line, and the gate of the sensing transistor can multiplex the (N+1)-th scan line configured to control the charging of the (N+1)-th row of pixel circuits, and thus there is no need to configure two different scan lines for each row of externally compensated pixel circuits 10, which reduces the number of scan lines used in the display panel.

In addition, since the N-th scan line is configured to control the charging of the N-th row of pixel circuits and the (N+1)-th scan line is configured to control the charging of the (N+1)-th row of pixel circuits, corresponding scanning signals required in the N-th scan line and the (N+1)-th scan line are the same in waveform but different in phase. Therefore, the corresponding scanning signals can be provided through corresponding gate driving units in the same gate driving circuit, eliminating the need for configuring multiple gate driving circuits, which reduces the number and occupied space of the gate driving circuits, thereby facilitating the realization of narrow borders.

In the above embodiments, the description of each embodiment has its own emphasis. For the parts not detailed in one embodiment, please refer to the relevant descriptions of other embodiments.

The display panel and the display device provided by the embodiments of the present disclosure are described in detail above, and specific embodiments are used herein to illustrate the principles and embodiments of the present disclosure. The description of the above embodiments is only used to help understand the method and the core idea of the present disclosure. Those skilled in the art should understand that the technical solutions described in the above embodiments can still be modified, or some of the technical features thereof can be equivalently replaced, and such modifications or replacements do not separate the essence of the corresponding technical solutions from the scope of the technical solutions of the embodiments of the present disclosure.

What is claimed is:

1. A display panel, comprising:

a plurality of pixel circuits arranged in an array; and a plurality of scan lines, wherein each of the plurality of scan lines is configured to control charging of a corresponding row of pixel circuits in the array, an N-th scan line of the plurality of scan lines is configured to control charging of a N-th row of pixel circuits in the array, a (N+1)-th scan line is configured to control charging of a (N+1)-th row of pixel circuits of the plurality of scan lines, N being a positive integer;

wherein each pixel circuit in the N-th row of pixel circuits comprises:

a driving transistor, wherein a first electrode of the driving transistor is electrically connected to a first power line, and a second electrode of the driving transistor is electrically connected to a second power line;

a writing transistor, wherein a first electrode of the writing transistor is electrically connected to a data line, a second electrode of the writing transistor is electrically connected to a gate of the driving transistor, and a gate of the writing transistor is electrically connected to the N-th scan line;

a sensing transistor, wherein a first electrode of the sensing transistor is electrically connected to a sensing line, a second electrode of the sensing transistor is electrically connected to the second electrode of the driving transistor, and a gate of the sensing transistor is electrically connected to the (N+1)-th scan line;

a light-emitting component, wherein an anode of the light-emitting component is electrically connected to the second electrode of the driving transistor, and a cathode of the light-emitting component is electrically connected to the second power line;

a storage capacitor, wherein a terminal of the storage capacitor is electrically connected to the gate of the driving transistor, and another terminal of the storage capacitor is electrically connected to the second electrode of the driving transistor;

a sensing capacitor, wherein a terminal of the sensing capacitor is electrically connected to the sensing line, and another terminal of the sensing capacitor is grounded;

a first switch, wherein a terminal of the first switch is electrically connected to the sensing line, another terminal of the first switch is electrically connected to a reference voltage line, and a control terminal of the first switch is electrically connected to a first control line; and a second switch, wherein a terminal of the second switch is electrically connected to the sensing line, another terminal of the second switch is electrically connected to an input terminal of an analog-to-digital converter, and a control terminal of the second switch is electrically connected to a second control line, wherein in a pre-charging stage of each of the plurality of pixel circuits, the writing transistor, the sensing transistor, and the first switch are turned on, a detection voltage is written into the gate of the driving transistor, and a pre-charging voltage is written into the second electrode of the driving transistor, and in a lifting stage of each of the plurality of pixel circuits, the writing transistor is turned on, the sensing transistor is turned off, and a potential of the second electrode of the driving transistor is lifted by the storage capacitor.

2. The display panel according to claim 1, wherein in a pre-detection stage of each of the plurality of pixel circuits, the writing transistor is turned off, the sensing transistor and the first switch are turned on, and the pre-charging voltage is written into the second electrode of the driving transistor.

3. The display panel according to claim 2, wherein in a detection stage of each of the plurality of pixel circuits, the writing transistor is turned off, the sensing transistor is turned on to charge the sensing capacitor during a preset time interval, and the second switch is turned on to obtain a potential of the second electrode of the driving transistor through the analog-to-digital converter.

4. The display panel according to claim 3, wherein in a reset stage of each of the plurality of pixel circuits, the writing transistor, the sensing transistor, and the first switch are turned on, a black frame insertion voltage is written into the gate of the driving transistor, and the pre-charge voltage is written into the second electrode of the driving transistor, thereby ensuring that detection stages performed by other rows of pixel circuits in the array are not affected.

5. The display panel according to claim 1, further comprising a gate driving circuit, and the gate driving circuit comprises a plurality of cascaded gate driving units and a plurality of logic AND gate units, wherein a first input terminal of each of the plurality of logic AND gate units is electrically connected to an output terminal of a corresponding one of the plurality of gate driving units, a second input terminal of each of the plurality of logic AND gate units is electrically connected to a first logic control line or a second logic control line, and an output terminal of each of the plurality of logic AND gate units is electrically connected to a corresponding scan line.

6. The display panel according to claim 5, wherein:

when the output terminal of one of the plurality of logic AND gate units is electrically connected to the gate of the writing transistor in an even row of pixel circuits, the second input terminal of the logic AND gate unit is electrically connected to the first logic control line; or when the output terminal of one of the plurality of logic AND gate units is electrically connected to the gate of the writing transistor in an odd row of pixel circuits, the second input terminal of the logic AND gate unit is electrically connected to the second logic control line.

7. A display device, wherein the display device comprises a display panel, and the display panel comprises:

a plurality of pixel circuits arranged in an array; and a plurality of scan lines, wherein each of the plurality of scan lines is configured to control charging of a corresponding row of pixel circuits in the array, an N-th scan line of the plurality of scan lines is configured to control charging of a N-th row of pixel circuits in the array, a (N+1)-th scan line is configured to control charging of a (N+1)-th row of pixel circuits of the plurality of scan lines, N being a positive integer;

wherein each pixel circuit in the N-th row of pixel circuits comprises:

a driving transistor, wherein a first electrode of the driving transistor is electrically connected to a first power line, and a second electrode of the driving transistor is electrically connected to a second power line;

a writing transistor, wherein a first electrode of the writing transistor is electrically connected to a data line, a second electrode of the writing transistor is electrically connected to a gate of the driving transistor, and a gate of the writing transistor is electrically connected to the N-th scan line;

a sensing transistor, wherein a first electrode of the sensing transistor is electrically connected to a sensing line, a second electrode of the sensing transistor is electrically connected to the second electrode of the driving transistor, and a gate of the sensing transistor is electrically connected to the (N+1)-th scan line;

a light-emitting component, wherein an anode of the light-emitting component is electrically connected to the second electrode of the driving transistor, and a cathode of the light-emitting component is electrically connected to the second power line;

a storage capacitor, wherein a terminal of the storage capacitor is electrically connected to the gate of the driving transistor, and another terminal of the storage capacitor is electrically connected to the second electrode of the driving transistor;

a sensing capacitor, wherein a terminal of the sensing capacitor is electrically connected to the sensing line, and another terminal of the sensing capacitor is grounded;

a first switch, wherein a terminal of the first switch is electrically connected to the sensing line, another terminal of the first switch is electrically connected to a reference voltage line, and a control terminal of the first switch is electrically connected to a first control line; and a second switch, wherein a terminal of the second switch is electrically connected to the sensing line, another terminal of the second switch is electrically connected to an input terminal of an analog-to-digital converter, and a control terminal of the second switch is electrically connected to a second control line, wherein in a pre-charging stage of each of the plurality of pixel circuits, the writing transistor, the sensing transistor, and the first switch are turned on, a detection voltage is written into the gate of the driving transistor, and a pre-charging voltage is written into the second electrode of the driving transistor, and in a lifting stage of each of the plurality of pixel circuits, the writing transistor is turned on, the sensing transistor is turned off, and a potential of the second electrode of the driving transistor is lifted by the storage capacitor.

8. The display device according to claim 7, wherein in a pre-detection stage of each of the plurality of pixel circuits, the writing transistor is turned off, the sensing transistor and the first switch are turned on, and the pre-charging voltage is written into the second electrode of the driving transistor.

9. The display device according to claim 8, wherein in a detection stage of each of the plurality of pixel circuits, the writing transistor is turned off, the sensing transistor is turned on to charge the sensing capacitor during a preset time interval, and the second switch is turned on to obtain a potential of the second electrode of the driving transistor through the analog-to-digital converter.

10. The display device according to claim 9, wherein in a reset stage of each of the plurality of pixel circuits, the writing transistor, the sensing transistor, and the first switch are turned on, a black frame insertion voltage is written into the gate of the driving transistor, and the pre-charge voltage is written into the second electrode of the driving transistor, thereby ensuring that detection stages performed by other rows of pixel circuits in the array are not affected.

11. The display device according to claim 7, further comprising a gate driving circuit, and the gate driving circuit comprises a plurality of cascaded gate driving units and a plurality of logic AND gate units, wherein a first input terminal of each of the plurality of logic AND gate units is electrically connected to an output terminal of a corresponding one of the plurality of gate driving units, a second input terminal of each of the plurality of logic AND gate units is electrically connected to a first logic control line or a second logic control line, and an output terminal of each of the plurality of logic AND gate units is electrically connected to a corresponding scan line.

12. The display device according to claim 11, wherein:

when the output terminal of one of the plurality of logic AND gate units is electrically connected to the gate of the writing transistor in an even row of pixel circuits, the second input terminal of the logic AND gate unit is electrically connected to the first logic control line; or when the output terminal of one of the plurality of logic AND gate units is electrically connected to the gate of the writing transistor in an odd row of pixel circuits, the second input terminal of the logic AND gate unit is electrically connected to the second logic control line.

* * * * *